United States Patent [19]
Arai et al.

[11] Patent Number: 5,570,156
[45] Date of Patent: Oct. 29, 1996

[54] CAMERA UTILIZING DETECTION OF VISUAL LINE

[75] Inventors: Takashi Arai, Tokyo; Hirofumi Nakano, Kanagawa-ken, both of Japan

[73] Assignee: Canon Kabushiki Kaisha, Tokyo, Japan

[21] Appl. No.: 272,903

[22] Filed: Jul. 8, 1994

Related U.S. Application Data

[63] Continuation of Ser. No. 934,121, Aug. 21, 1992, abandoned.

[30] Foreign Application Priority Data

Aug. 26, 1991 [JP] Japan .................................. 3-213439
Sep. 6, 1991 [JP] Japan .................................. 3-227084

[51] Int. Cl.⁶ ......................... G03B 17/20; H04N 5/225
[52] U.S. Cl. ..................... 396/51; 348/78; 348/334; 396/281; 396/296
[58] Field of Search ............................. 354/62, 471, 219, 354/410, 402, 468, 409; 348/334, 335, 78

[56] References Cited

U.S. PATENT DOCUMENTS

| | | | |
|---|---|---|---|
| 4,574,314 | 3/1986 | Weinblatt | 358/227 |
| 4,614,975 | 9/1986 | Kaite | 358/227 |
| 4,660,092 | 4/1987 | Nutting | 358/224 |
| 5,210,566 | 5/1993 | Nishida | 354/402 |
| 5,214,466 | 5/1993 | Nagano et al. | 354/402 |

*Primary Examiner*—W. B. Perkey
*Attorney, Agent, or Firm*—Robin, Blecker, Daley & Driscoll

[57] ABSTRACT

A camera includes an electronic viewfinder adapted to electrically display a photographing image, a visual line detection unit for detecting the position of a camera operator's visual line on a picture plane of the electronic viewfinder, and a display processing unit for displaying on the electronic viewfinder a photographing-related information involved in a camera photographing. In such a camera, the display processing unit controls a display position of the photographing-related information in accordance with an output of the visual line detection unit.

69 Claims, 10 Drawing Sheets

FIG.4A
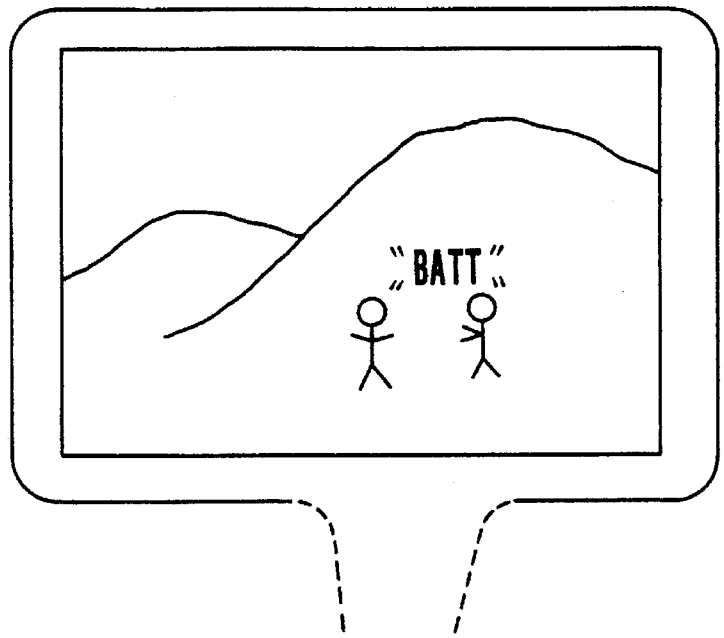
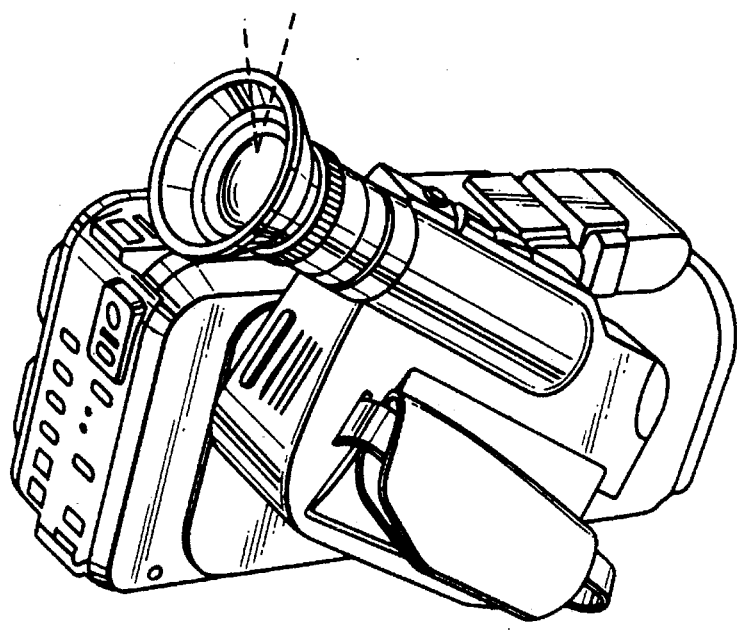
FIG. 4B

- S21: DETECT CORNEA-REFLECTED IMAGE COORDINATE $Zd'$
- S22: DETECT BOUNDARY POINT COORDINATES $Zb', Za', Yb', Ya'$ BETWEEN IRIS AND PUPIL
- S23: COMPUTE PUPIL CENTER $c'$
- S24: COMPUTE DISPLACEMENT ANGLES OF EYEBALL OPTICAL AXIS (TWO KINDS IN Z-X PLANE AND IN X-Y PLANE)
- S25: COMPUTE FIXATION POINT

FIG.15A
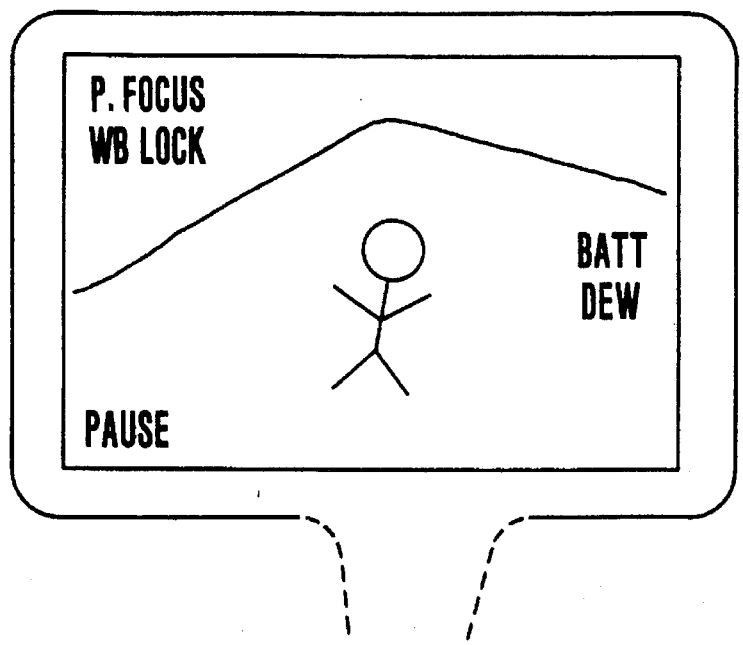
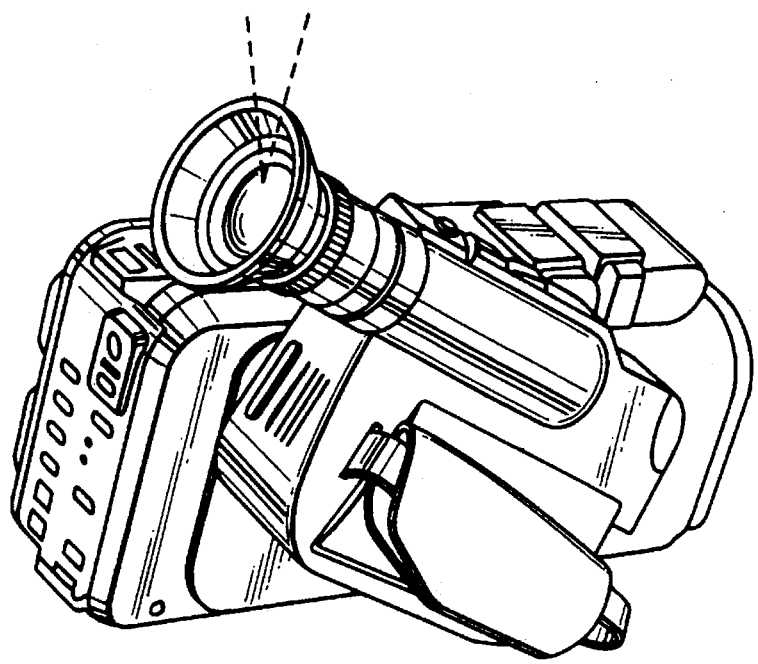
FIG. 15B

CAMERA UTILIZING DETECTION OF VISUAL LINE

This is a continuation application under 37 CFR 1.62 of prior application Ser. No. 07/934,121, filed Aug. 21, 1992, now abandoned.

BACKGROUND OF THE INVENTION

1. Field of the Invention

The present invention relates to a camera in which a camera operator's visual line (line of sight) is detected to be utilized.

2. Description of the Related Art

As an example of such a camera, explained hereinafter is a video camera provided with an electronic viewfinder adapted to display a photographing image.

In such type of conventional video camera having an electronic viewfinder adapted to display a photographing image on a small-sized display implemented by, for instance, liquid crystal display elements, a camera operator is obliged to perform the operation for functional inputs through switches or the like, while peeping through the electronic viewfinder, if he or she wishes to perform the operation for functional inputs under photographing.

FIGS. 15A and 15B depict view showing, by way of example, a picture plane display of an electronic viewfinder unit of the conventional video camera. In a periphery of a camera subject image, for operator's sake, there are selectively displayed, together with the camera subject image, various kinds of information necessary for the operation of the video camera, for example, photographing mode information (focus, shutter, white balance mode information, etc.), camera operation information (under photographing, standby, stop, etc.), camera defective information (dew condensation, etc.), power source information (battery exhaustion warning, etc.) and tape information for recording images (remaining effective time of tape, etc.).

According to such a display, however, information such as various modes display and warning display is indicated or displayed in small size at peripheral edges or corners of the picture plane of the electronic viewfinder. Hence, the operator will be obliged to shift his or her visual line from the camera subject to the periphery and thus will encounter the fear of losing a picture recording timing or a shutter opportunity. Further, there still remains a problem such that the display of information is hard to read, thereby causing the information to be overlooked.

Furthermore, when the operator sets up the various photographing modes and the like, he or she has to once take his or her eye off the viewfinder for the purpose of seeing and operating various function switches provided on a surface of the camera main body. As a result, it will be the cause of disturbance of the image plane or picture plane and of losing sight of the camera subject.

Recently, there is a tendency such that various functions associated with the video camera are increasing owing to the variety in user's application or usage, while miniaturization of the video camera is progressing. In the light of such a tendency, the foregoing problems become serious.

SUMMARY OF THE INVENTION

It is, therefore, an object of the present invention to provide a camera capable of setting up photographing conditions while confirming the same, without taking an operator's eye off a camera subject image displayed on an electronic viewfinder.

To achieve the above-described object, according to one aspect of the present invention, there is provided a camera, which comprises an electronic viewfinder adapted to electrically display a photographing image, a visual line detection means for detecting the position of a camera operator's visual line on a picture plane of the electronic viewfinder, and a display processing means for displaying on the electronic viewfinder a photographing-related information involved in a camera photographing, wherein the display processing means controls a display position of the photographing-related information in accordance with an output of the visual line detection means.

It is another object of the present invention to provide a camera with an improved detection accuracy of the visual line detection means.

To achieve the above-described object, according to another aspect of the present invention, there is provided a camera, which comprises an electronic viewfinder adapted to electrically display a photographing image, and a visual line detection means for detecting the position of a camera operator's visual line on a picture plane of the electronic viewfinder, wherein a spectral characteristic of light emitted from a display means of the electronic viewfinder is set to a spectral characteristic having no influence on light emitted from an illumination means for visual line detection included in the visual line detection means.

The objects, features and advantages of the present invention will become more apparent from the following detailed description of preferred embodiments of the present invention, taken in conjunction with the accompanying drawings.

BRIEF DESCRIPTION OF THE DRAWING

FIGS. 4A and 4B show a view useful for understanding display on the finder picture plane in the first embodiment;

FIGS. 15A and 15B show a view useful for understanding a picture plane display of an electronic viewfinder unit of the conventional video camera.

DETAILED DESCRIPTION OF THE PREFERRED EMBODIMENTS

Preferred embodiments of the present invention will be described with reference to the accompanying drawings.

First, described is a principle of a detection method of detecting as to where an observer or operator observes on an observation face, i.e., a so-called visual line (visual axis).

According to the instant embodiment, parallel pencil of rays from a light source is projected to a front portion of an observer's eyeball, and a position of a cornea-reflected image by a reflected light from his or her cornea and an image formation position of his or her pupil are detected to obtain the visual axis.

Figure 1:
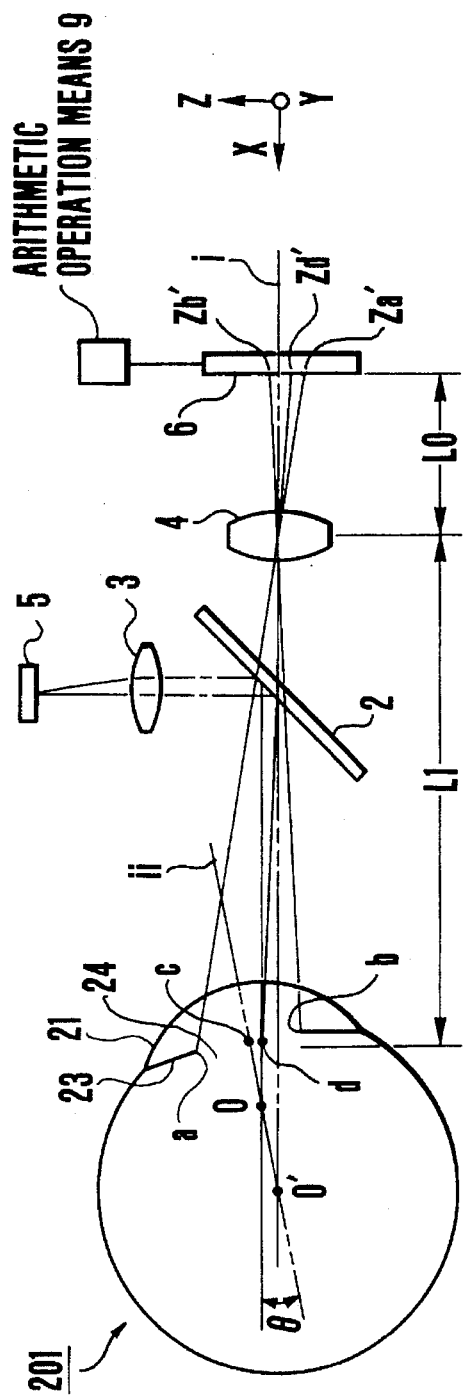
FIG. 1 is a block diagram schematically showing the arrangement of a visual line detection system to which one embodiment of the present invention is applied.
Figure 2:
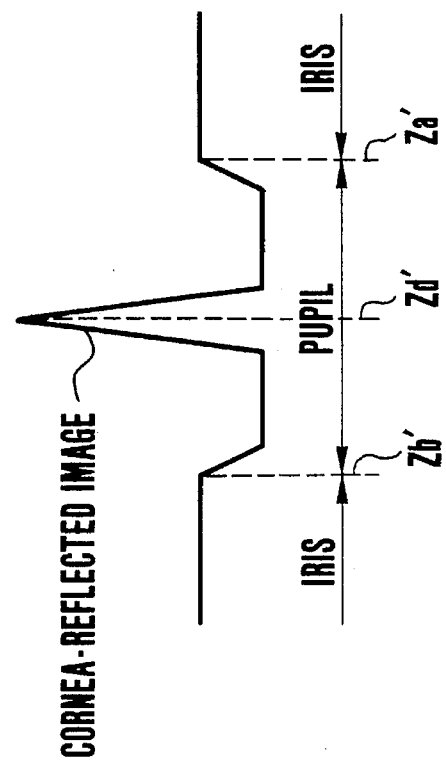
FIG. 2 is a schematic view illustrating intensity of an output signal from a photo-electric element array shown in FIG. 1.

FIGS. 1 and 2 are views useful for understanding a principle of visual line detection method. FIG. 1 is a block diagram schematically showing the arrangement of a visual line detection optical system, and FIG. 2 is a schematic view illustrating intensity of an output signal from a photoelectric element array 6 shown in FIG. 1.

In FIG. 1, reference numeral 5 denotes a light source such as light emitting diode adapted to irradiate infrared light which is insensitive for observers. The light source 5 is disposed at a focal plane of a light projection lens 3.

The infrared light emitted from the light source 5 passes through the light projection lens 3 in the form of parallel pencil rays and is then reflected by a half-mirror 2 to illuminate a cornea 21 of an eyeball 201.

At that time, the cornea-reflected image d, which is formed by part of the infrared light beams reflected from a surface of the cornea 21, is transmitted through the half-mirror 2 and then focussed by a light receiving lens 4, so that the image d is re-formed at a position Zd' on the photoelectric element array 6.

Pencil of rays from edge portions a and b of an iris 23 is transmitted through the half-mirror 2 and the light receiving lens 4, so that images associated with the edge portions a and b are formed at positions Za' and Zb' on the photo-electric element array 6, respectively.

Assuming that the rotation angle 0 of an optical axis (ii) of the eyeball 201 with respect to an optical axis (i) of the light receiving lens 4 is small, if the Z coordinates of the edge portions a and b of the iris 23 are denoted by Za and Zb, respectively, the Z coordinate Zc of the center c of the iris 23 is represented by:

$$Zc = (Za + Zb)/2$$

If the Z coordinate of a generating position of the cornea-reflected image d, and a distance between the center of curvature O of the cornea 21 and the center c of the iris 23 are denoted by Zd and Oc, respectively, the rotation angle $\Theta$ of the optical axis (ii) of the eyeball 201 substantially satisfies the following equation:

$$Oc \times \sin \Theta = Zc - Zd \qquad (1)$$

Here, the Z coordinate Zd of the generating position of the cornea-reflected image d and the Z coordinate of the center of curvature O of the cornea 21 are coincident with each other. Consequently, in an arithmetic operation means 9, it is possible to obtain the rotation angle $\Theta$ of the optical axis (ii) of the eyeball 201 by detecting positions of the respective singular points (cornea-reflected image, and images associated with the edge portions a and b of the iris) projected on the photo-electric element array 6 as shown in FIG. 2. Here, the equation (1) is replaced by the following equation:

$$\beta \times Oc \times \sin \Theta = (Za' + Zb')/2 - Zd' \qquad (2)$$

wherein β denotes a magnification of image formation which is determined by the distance L1 between the generating position of the cornea-reflected image d and the light receiving lens 4 and the distance L0 between the light receiving lens 4 and the photo-electric element array 6, and usually takes an approximately constant value.

A video camera according to the first embodiment of the present invention, to which the above-mentioned visual line detection scheme is applied, will be described in detail referring to FIGS. 3–9.

Figure 3:
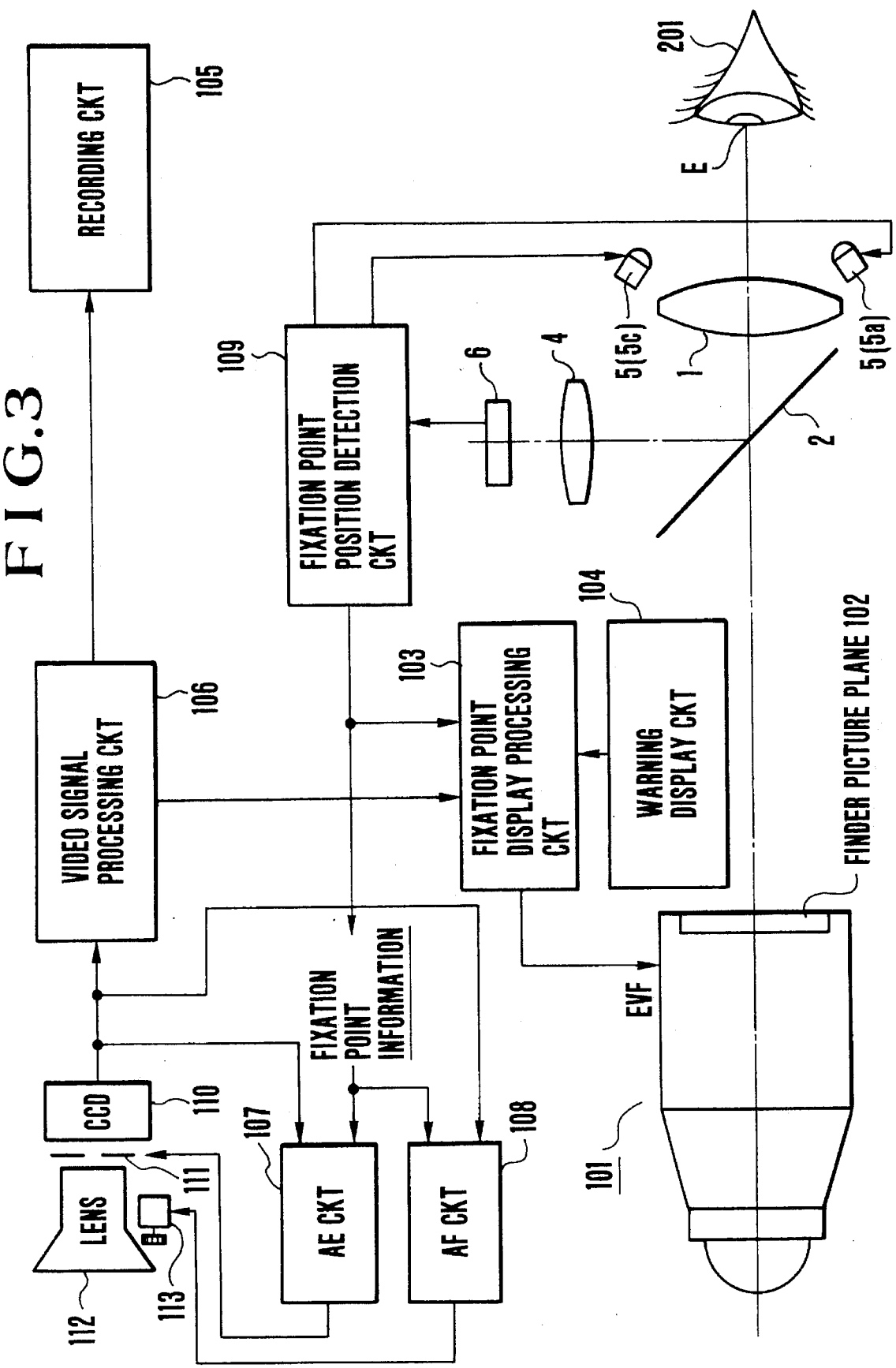
FIG. 3 is a block diagram schematically showing an arrangement of essential portions of a video camera according to the first embodiment of the present invention.

FIG. 3 is a block diagram schematically showing an arrangement of essential portions of a video camera according to the first embodiment of the present invention, wherein the same parts are denoted by the same reference numerals as those of FIG. 1.

In FIG. 3, reference numeral 1 denotes an ocular or eyepiece; 2 a half-mirror which also serves as a beam splitter for visible-light-transmission/infrared-light-reflection; 4 a light receiving lens; 5 an illumination means comprising, for example, light emitting diodes; and 6 a photo-electric element array. The light receiving lens 4 and the photo-electric element array 6 constitute part of light receiving means.

As the photo-electric element array 6, usually, there is used a device in which a plurality of photo-electric elements are arranged perpendicularly to the drawing on a one-dimension basis, but if necessary, it is possible to use a device in which a plurality of photo-electric electric elements are arranged on a two-dimension basis.

These structural elements 1, 2, 4, 5 and 6, as mentioned above, constitute a visual line detection system for an operator's or observer's eyeball 201.

Further, in FIG. 3, reference numeral 101 denotes an electronic viewfinder (EVF); and 102 a finder picture plane of the electronic viewfinder 101 using a black-and-white small Braun tube.

In this instance, a projection image appearing on the finder picture plane 102 is introduced via the eyepiece 1 to an eye point E.

A visual line detection means according to the present embodiment comprises the visual line detection system implemented by the above-mentioned structural elements 1, 2, 4, 5 and 6, and part of a fixation point position detection circuit 109 as an arithmetic operation means, that is, an eyeball optical axis detection circuit, an eyeball determining circuit, a visual axis correction circuit and a fixation point detection circuit.

In the visual line detection system, infrared light radiated from an infrared light emitting diode (IRED) 5 illuminates an observer's eyeball 201 near the eye point E.

The infrared light reflected from the eyeball 201 is reflected at the half-mirror 2 and then converged through the light receiving lens 4 so as to form an image on the photo-electric element array 6.

The fixation point position detection circuit 109 carries out a fixation point detection with software of a microcomputer on the basis of a signal outputted from the photo-electric element array 6.

The fixation point position is the position of a camera operator's visual line on the finder picture plane 102 of the electronic viewfinder 101.

Reference numeral 103 denotes a fixation point display processing circuit for mixing a video signal outputted from a video signal processing circuit 106 with an indication of fixation point information outputted from the fixation point position detection circuit 109. If it is desired that the operator's fixation point is displayed on the finder picture plane 102, it is set up by a mode switch (not illustrated).

Reference numeral 104 denotes a warning display circuit adapted to output to the fixation point display processing circuit 103, if necessary, information which ought to be known to a video camera operator, for example, a warning indicating that a remaining amount of tape is little, a warning indicating that a remaining amount of battery power is little, or the like. The warning display circuit 104 serves to display such warning information on the finder picture plane 102 under the control of the fixation point display processing circuit 103.

Reference numeral 105 denotes a recording circuit for generating a recording signal for recording on a recording medium; and 106 a video signal processing circuit for converting an image pickup signal formed by a CCD (image pickup device) 110 into a predetermined video signal.

Reference numeral 107 denotes an automatic exposure (AE) circuit for an exposure control; 108 an automatic focusing (AF) circuit for an automatic focusing control; 113 a focus motor; 110 a CCD for image sensing; 111 a lens diaphragm; and 112 a lens group.

An image obtained through the lens group 112 is picked up via the lens diaphragm 111 on the CCD 110.

A signal outputted from the CCD 110 is fed via the video signal processing circuit 106 to the recording circuit 105.

Further, the output signal obtained from the CCD 110 is applied to the AE circuit 107 and the AF circuit 108 to perform a detection of brightness or luminance of the image and an edge detection, so as to control the diaphragm 111 and the focus motor 113, respectively.

An output signal of the video signal processing circuit 106 is mixed, in the fixation point display processing circuit 103, with information representing an operator's fixation point position from the fixation point position detection circuit 109, and then displayed on the finder picture plane 102.

When a warning indication signal is outputted from the warning display circuit 104, the fixation point display processing circuit 103 mixes the video signal with the warning indication signal, and then provides a warning indication on the finder picture plane 102 of the electronic viewfinder 101. The warning indication on the finder picture plane 102 is implemented at a fixation point position outputted from the fixation point position detection circuit 109. FIGS. 4A and 4B show an example of the display on the finder picture plane 102 when the warning indication is implemented, wherein a battery exhaustion warning "BATT" is indicated at part of a person image on which the operator fixes his or her eye.

The fixation point information obtained from the fixation point position detection circuit 109 is fed to the fixation point display processing circuit 103, and to the AE circuit 107 and the AF circuit 108 as well to be used for area set up for extracting video signals near the fixation point in order to implement the AE/AF controls to the neighborhood of the fixation point.

Now, a method of detecting an operator's visual line (fixation point) according to the embodiment of the present invention will be described in detail referring to FIGS. 5–8.

Figure 5:
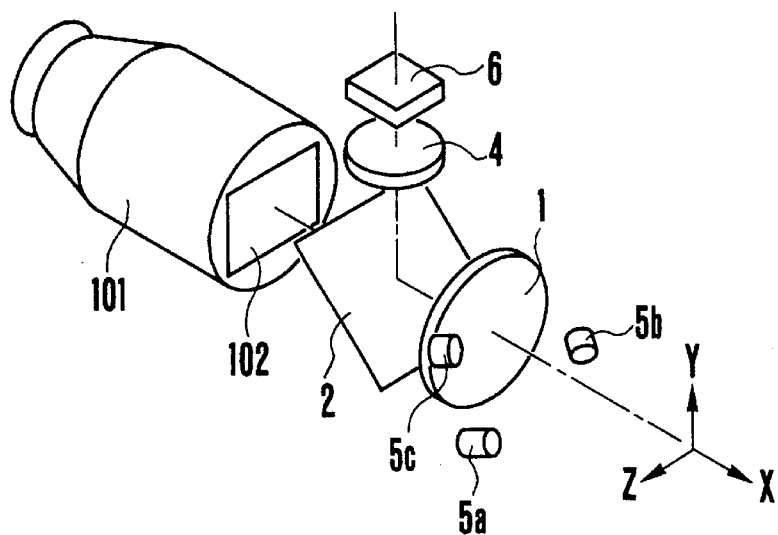
FIG. 5 is a perspective view schematically showing an arrangement of essential part of the visual line detection system shown in FIG. 3.
Figure 6A:
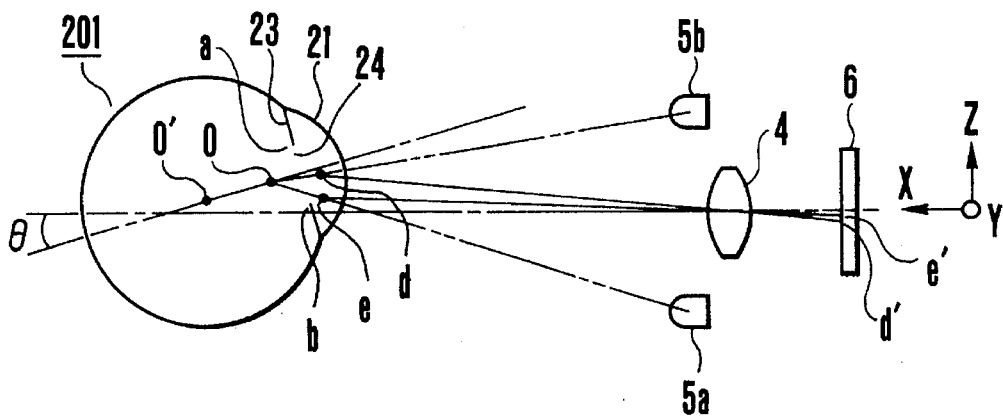
FIGS. 6(A) and 6(B) each are a schematic view useful for understanding an optical principle shown in FIG. 5.
Figure 6B:
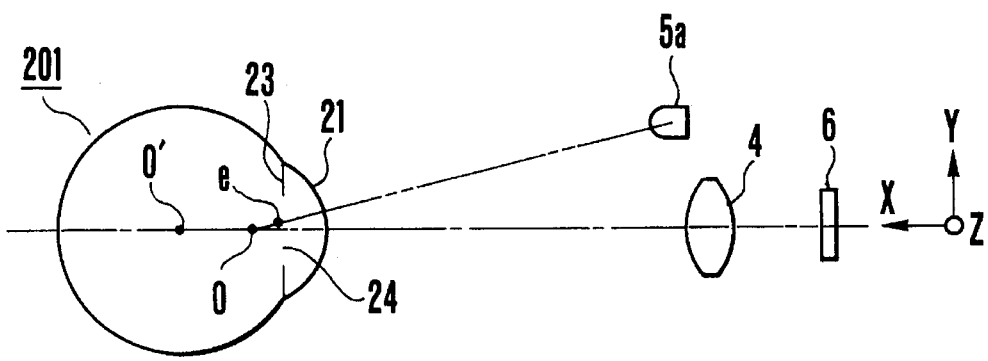

FIG. 5 is a perspective view schematically showing an arrangement of essential part of the visual line detection system shown in FIG. 3. FIGS. 6(A) and 6(B) each are a block diagram useful for understanding an optical principle of the visual line detection system.

Infrared light emitting diodes 5a, 5b and 5c for use in illumination are used to detect a distance between a camera and an operator's eyeball, making a pair of two pieces. In accordance with a camera figure or posture, a pair of infrared light emitting diodes 5a and 5b is used to detect a horizontal position, and a pair of infrared light emitting diodes 5b and 5c is used to detect a vertical position.

While FIG. 5 and FIGS. 6(A) and 6(B) show no means for detecting a camera figure, the camera figure is detected by utilizing a mercury switch or the like.

The infrared light emitting diodes 5a and 5b are disposed at the respective positions shifted in an arrayal direction (Z axis direction) of the photo-electric element array 6 with respect to an optical axis (X axis) of the light receiving lens 4 and in a direction perpendicular to the arrayal direction (Z axis direction) of the photo-electric element array 6.

In FIG. 6(A), pencil of rays from the infrared light emitting diodes 5a and 5b disposed separately in an arrayal direction (Z axis direction) of the photo-electric element array 6 forms cornea-reflected images e and d at positions separated from each other in a Z axis direction, respectively.

Here, the Z coordinate of a middle point between the cornea-reflected images e and d and the Z coordinate of the center of curvature O of the cornea 21 are coincident with each other.

A distance between the cornea-reflected images e and d is varied in correspondence with a distance between the infrared light emitting diodes 5a, 5b and the observer's eyeball 201. Consequently, it is possible to obtain the image-formation magnification B of each of the cornea-reflected images by detecting the positions of cornea-reflected images e' and d' re-formed on the photo-electric element array 6.

In FIG. 6(B), the infrared light emitting diodes 5a and 5b (not shown) disposed in a direction perpendicular to the arrayal direction of the photo-electric element array 6 irradiate an observer's eyeball from the diagonal upper direction. Hence, if an observer's eyeball does not rotate in a vertical direction (within an X-Y plane), the cornea-reflected image e (d not shown) is formed with displacement in a (+) Y direction in the drawing apart from the center of curvature O of the cornea 21 and the center of the pupil 24.

Figure 7A:
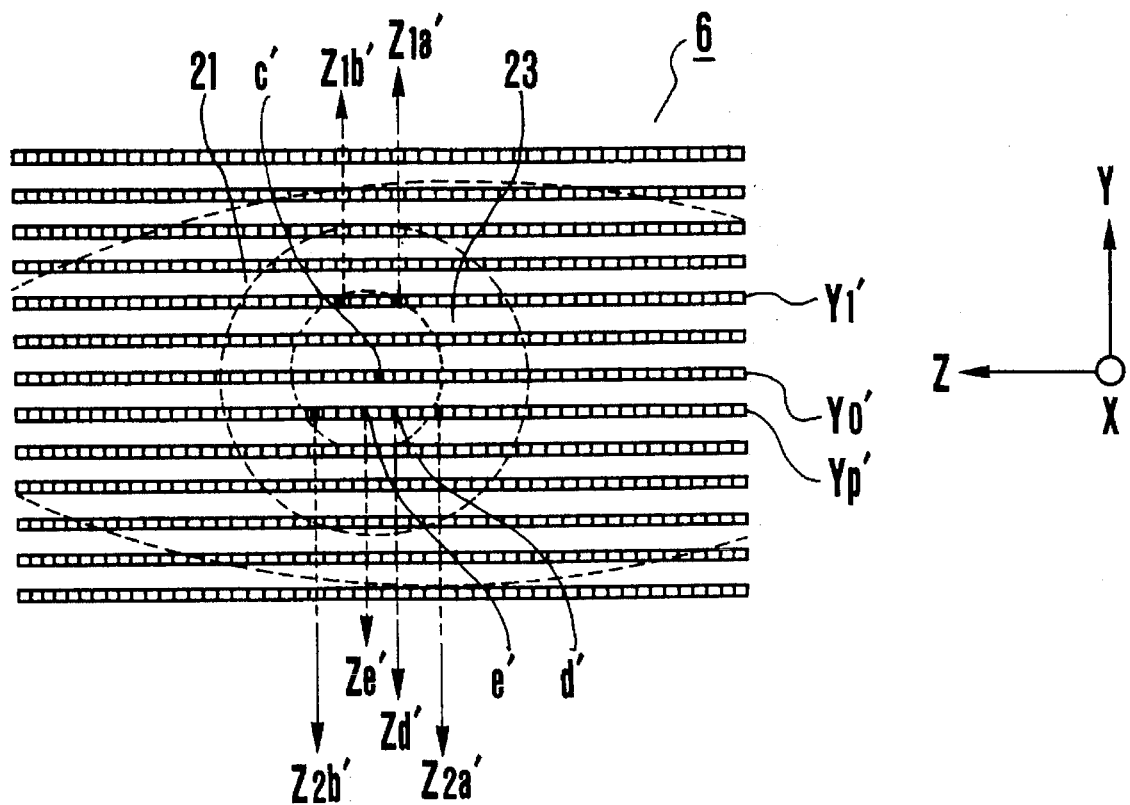
FIGS. 7(A) and 7(B) each are an explanatory view illustrating a reflected image on planes of the photo-electric element array according to the first embodiment.
Figure 7B:
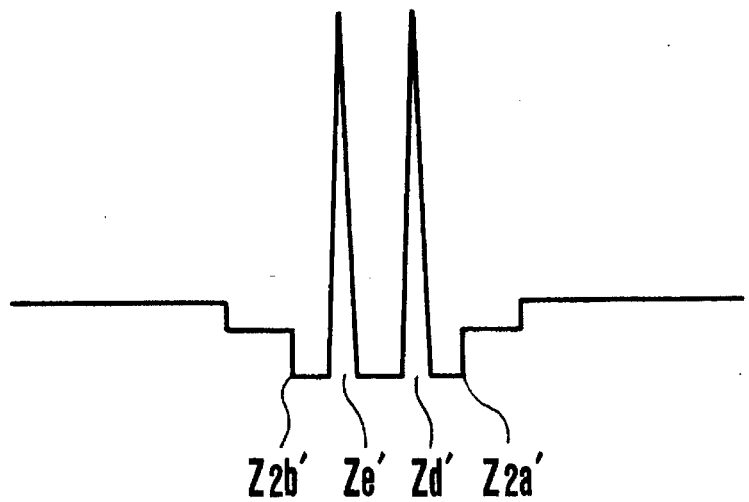

FIG. 7(A) is an explanatory view illustrating a reflected image from the eyeball projected on planes of a plurality of photo-electric element arrays of the photo-electric element array 6, which shows the reflected image from the eyeball projected on the photo-electric element array 6. In FIG. 7(A), the cornea-reflected images e' and d' are re-formed on a photo-electric element array Yp'. FIG. 7(B) shows an output signal obtained from the photo-electric element array Yp'.

Figure 8:
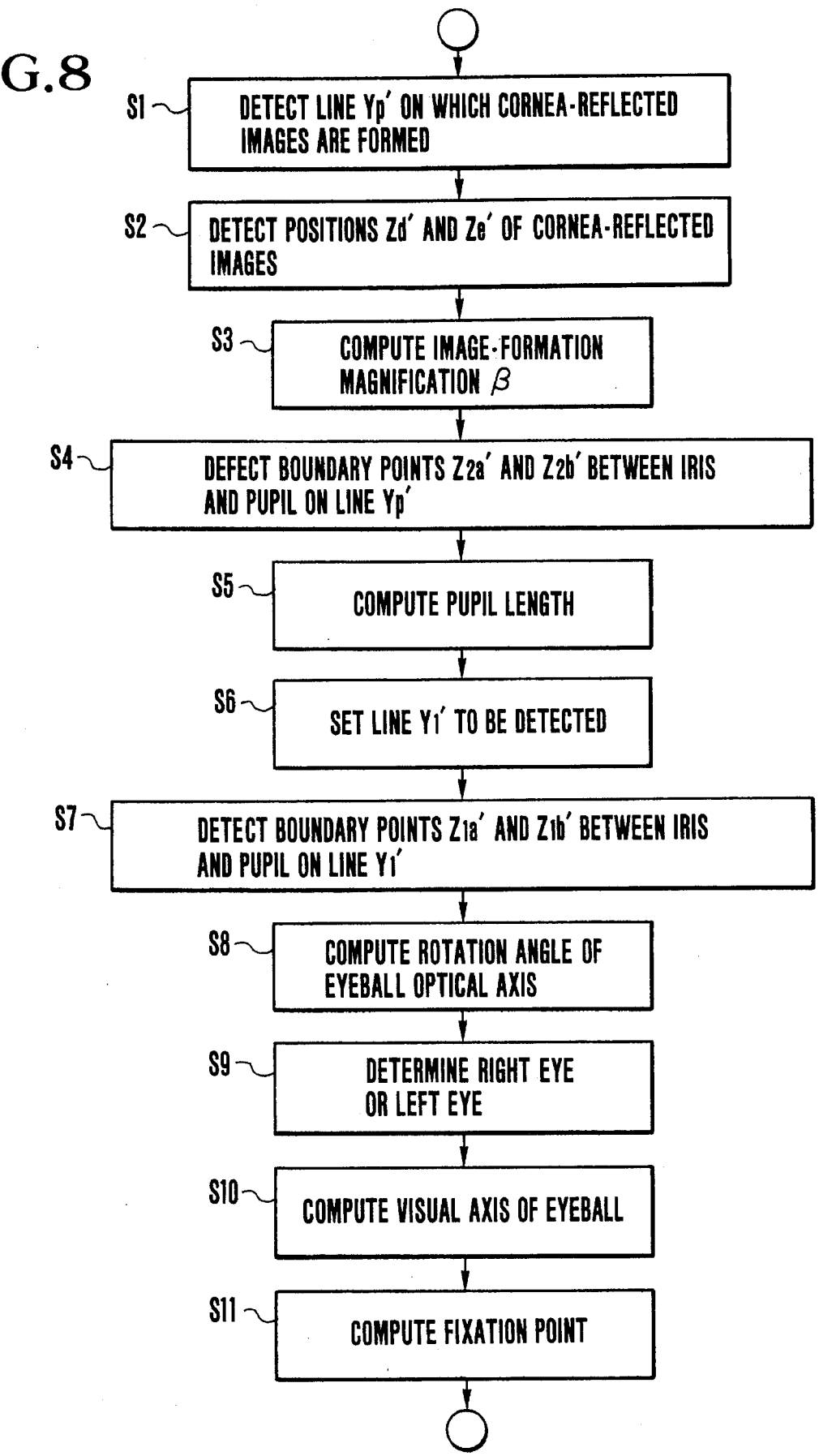
FIG. 8 is a sequence flow chart useful for understanding a visual line detection operation of the visual line detection system according to the first embodiment.

Next, a visual line detection operation of the above-mentioned visual line detection system will be described referring to a sequence flow chart of FIG. 8.

First, in step S1, an eyeball optical axis detection circuit included in the fixation point position detection circuit 109 detects a rotation angle of an eyeball optical axis. Next, image signals of the photo-electric element array 6 are read out in turn from a (–) Y direction shown in FIG. 7(A), so as to detect a photo-electric element array (line) Yp' on which the cornea-reflected images e' and d' are re-formed.

In step S2, detected is the positions Zd' and Ze' of the cornea-reflected images e' and e in the arrayal direction.

In step S3, the image-formation magnification B of the optical system is obtained from an interval (|Zd'–Ze'|) between the cornea-reflected images e' and d.

In step S4, boundary points Z2a' and Z2b' between the iris 23 and the pupil 24 are detected on the photo-electric element array (line) Yp'.

In Step S5, calculated is a pupil length (|Z2a'–Z2b'|) on the photo-electric element array (line) Yp'.

In step S6, as shown in FIG. 7(A), usually, the photo-electric element array Yp' on which the cornea-reflected image are formed is generated with displacement in a (–) Y direction in the drawing apart from a photo-electric element array Y0' in which the center c' of the pupil 24 exists, and another photo-electric element array Y1' to be subjected to read-out of the image signal is computed on the basis of the image-formation magnification β and the pupil length. Here, the photo-electric element array Y1' is established at the position well away from the photo-electric element array Yp'.

Likewise, in step S7, upon detecting the boundary points Z1a' and Z1b' between the iris 23 and the pupil 24 on the photo-electric element array Y1', a position (Zc', Yc') of the center c' of the pupil 24 is obtained by using, among from the boundary points (Z1a', Y1'), (Z1b', Y1'), (Z2a', Yp'), and (Z2b', Yp'), at least three points.

Further, in step S8, the rotation angles of the eyeball optical axis are computed. When the equation (2) is modified by using the positions (Zd', Yp') and (Ze', Yp') of the cornea-reflected images, the rotation angles $\Theta z$ and $\Theta y$ of the eyeball optical axis satisfy the following equations:

$$\beta \times Ocx\sin \Theta z = Zc' - (Zd' + Ze')/2' \quad (3)$$

$$\beta \times Ocx\sin \Theta y = Yc' - Yp' + \delta Y' \quad (4)$$

where Y' is a value for correcting the positions of image re-formation of the cornea-reflected images e' and d'. Actually, such positions are displaced to shift in a Y axis direction with respect to a Y coordinate of the center of curvature O of the cornea 21 on the photo-electric element array 6, since the infrared light emitting diodes 5 are disposed in a direction perpendicular to the arrayal direction of the photo-electric element array 6 with respect to the light receiving lens 4. This displacement is corrected by the value δY'.

In step S9, the eyeball determination circuit included in the fixation point position detection circuit 109 determines whether an observer's eye peeping through the viewfinder 101 is the right eye or left eye in accordance with, for example, a distribution of the computed rotation angle of the eyeball optical axis.

In step S10, the visual axis correction circuit corrects a visual axis on the basis of the eyeball determination information and the rotation angle of the eyeball optical axis.

In step S11, the fixation point detection circuit computes a fixation point on the basis of an optical constant of the finder optical system.

In this manner, the processing operation for detection of the visual line is performed. The above-mentioned scheme of the visual line detection, however, has been associated with the following drawbacks.

When operator's visual line information on a viewfinder picture plane is utilized for control of a video camera, a photo-electric device for use in visual line detection detects a video signal which is of a reflected image of the eyeball by infrared light for visual line detection, and a video signal which is of a reflected image of the eyeball by the viewfinder light as well. As a result, it will be the cause of decrease in signal-to-noise ratio (S/N) and thus of decrease in visual line detectible accuracy.

Figure 9:
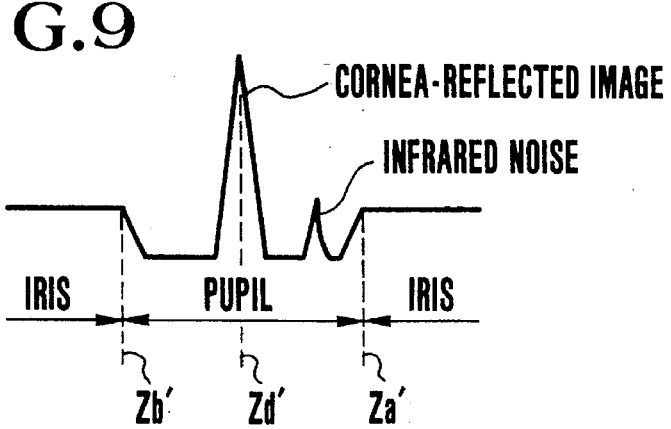
FIG. 9 is a view depicting an intensity of an output signal of the photo-electric element array into which noise is mixed.

Specifically, in a case where strong infrared light, for example, sunlight and so on, is contained in the camera subject image, it will notably appear, as shown in FIG. 9, as noise on an output of the photo-electric element array. Thus, it will be the cause of decrease in visual line detectible accuracy.

In view of this matter, the finder picture plane 102 according to the present embodiment is provided with display means having characteristics as follows.

Figure 10:
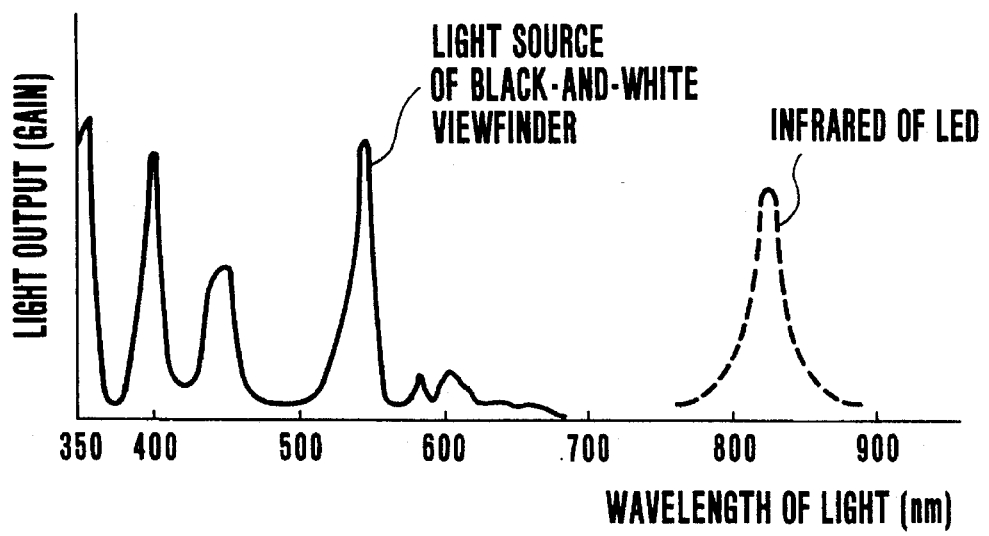
FIG. 10 is a view depicting a spectral characteristic involved in the finder picture plane using a black-and-white small Braun tube of display means and a spectral characteristic of light emitted from an infrared light emitting diode, according to the instant embodiment.

FIG. 10 depicts a spectral characteristic involved in the finder picture plane 102 using a black-and-white small Braun tube of display means and a spectral characteristic of light emitted from the infrared light emitting diode 5.

In FIG. 10, generally, the infrared light emitting diode 5 has a peak value in a gain between wavelength 800 nm–1000 nm.

The finder picture plane 102 used in the present embodiment is provided with a spectral characteristic having a distribution, as shown in FIG. 10, such that the gain is rapidly increased below wavelength 700 nm.

Consequently, according to the finder picture plane 102 used in the present embodiment, even if a camera subject, which is strong in infrared intensity, for instance, the sunlight, is photographed, it does not appear on the finder picture plane 102 as the infrared light, that is, light having a peak value in a gain between wavelength 800 nm–1000 nm. Hence, it is not mixed as infrared noise with the output signal of the photo-electric element array 6. Thus, it is possible to increase the visual line detectible accuracy.

While the present embodiment shows the use of the finder picture plane using a black-and-white small Braun tube, the present invention is not restricted to such a use. For example, a finder picture plane using a color liquid crystal display may also be applicable to the present invention, and it is sufficient to provide a spectral characteristic having no influence on light of the infrared light emitting diode 5.

Figure 11:
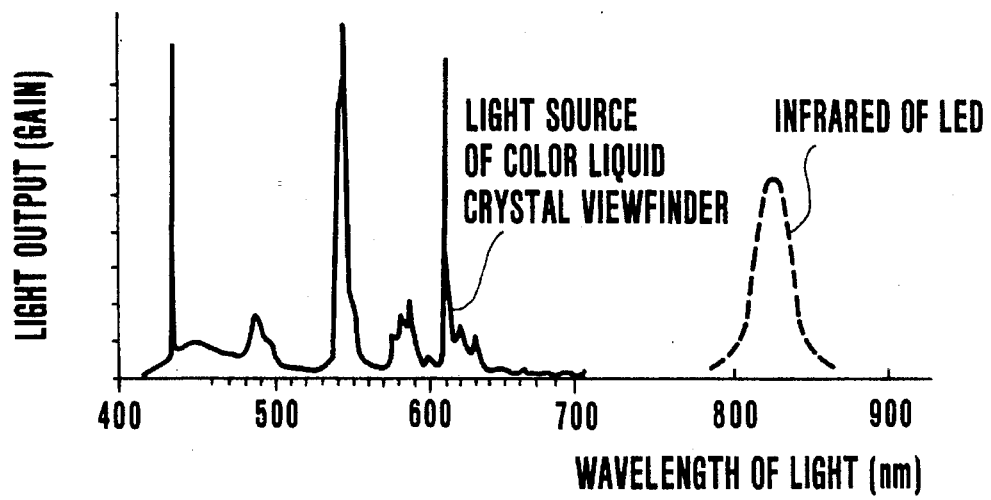
FIG. 11 is a view depicting a spectral characteristic of light emitted from a finder picture plane using a color liquid crystal display and a spectral characteristic of light emitted from the infrared light emitting diode, according to the instant embodiment.

FIG. 11 depicts, by way of example, a spectral characteristic of light emitted from a finder picture plane 102 using a color liquid crystal display having no influence on light of the infrared light emitting diode 5 and a spectral characteristic of light emitted from the infrared light emitting diode 5.

The spectral characteristic of light emitted from the finder picture plane 102 using the color liquid crystal display has a distribution such that the gain is rapidly increased below wavelength 700 nm.

Therefore, similar to the finder picture plane using a black-and-white small Braun tube, the finder picture plane 102 using the color liquid crystal display also has no influence on light emitted from the infrared light emitting diode 5.

Hence, the light of the finder picture plane using the color liquid crystal display is not mixed as infrared noise with the output signal of the photo-electric element array 6. Thus, it is possible to increase the visual line detectible accuracy.

A video camera according to the second embodiment of the present invention, which utilizes the visual line detection scheme, will be described hereinafter.

Figure 12:
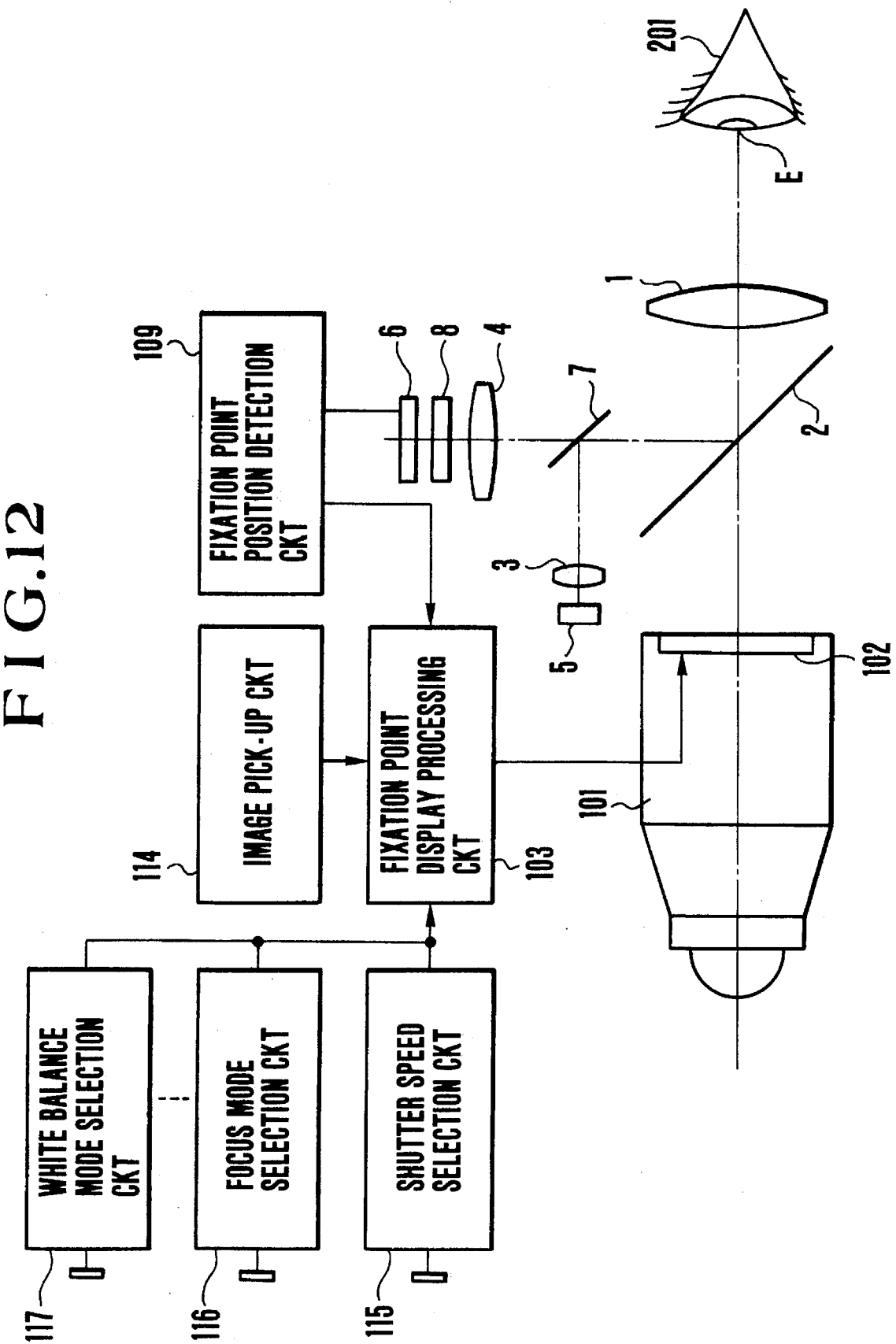
FIG. 12 is a block diagram schematically showing an arrangement of essential portions of a video camera according to the second embodiment of the present invention.

FIG. 12 is a block diagram schematically showing an arrangement of essential portions of a video camera according to the second embodiment of the present invention, wherein the same parts are denoted by the same reference numerals as those of FIG. 3, and the explanation thereof will be omitted.

In FIG. 12, reference numeral 3 denotes a light projection lens; 7 an eye-point half-mirror; 8 visible-light cut filter; 114 an image pick-up circuit for converting a camera subject image into a video signal in the form of an electrical signal; 115 a shutter speed selection circuit for selecting a shutter speed; 116 a focus mode selection circuit for selecting a focus mode; and 117 a white balance mode selection circuit for selecting a white balance mode.

Infrared light radiated from an infrared light emitting diode 5 is reflected a the half-mirror 7, and is further reflected at the half-mirror 2 to irradiate or illuminate an observer's eyeball 201 near the eye point E.

The infrared light reflected from the eyeball 201 is reflected at the half-mirror 2, transmitted through the half-mirror 7 and then converged through the light receiving lens 4 so as to form an image on the photo-electric element array 6, while eliminating visible light by the visible-light cut filter 8.

The fixation point position detection circuit 109 is implemented with software of a microcomputer on the basis of a flow described after.

Next, a flow for detecting a fixation point according to the second embodiment will be described.

Figure 13:
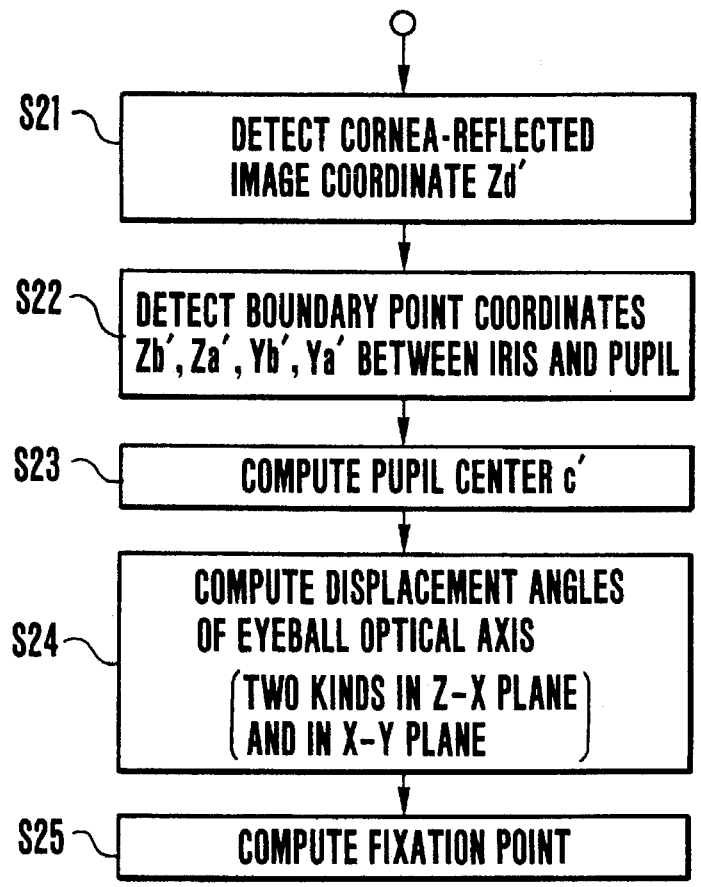
FIG. 13 is a sequence flow chart for detection of the visual line according to the second embodiment.
Figure 14:
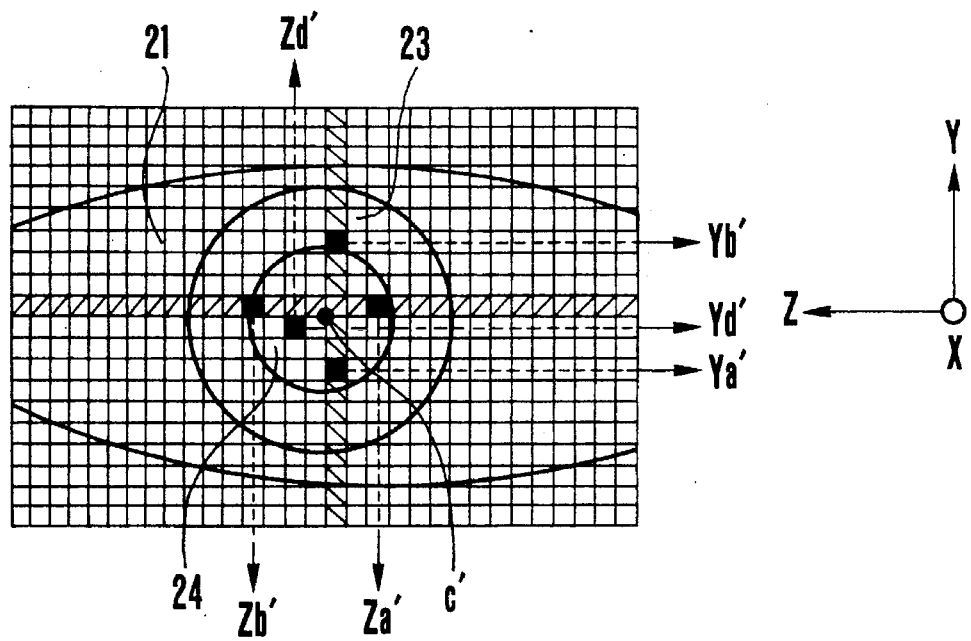
FIG. 14 is an explanatory view illustrating a reflected image from the eyeball projected on planes of the photoelectric element array, according to the second embodiment.

FIG. 13 is a flow chart for detection of the fixation point according to the second embodiment. FIG. 14 is an explanatory view illustrating a reflected image from the eyeball projected on planes of a plurality of photo-electric element arrays of the photo-electric element array 6, wherein the same parts are denoted by the same reference numerals as those of FIG. 1, and the explanation thereof will be omitted.

In FIG. 14, Za', Zb' and Zd' denote positions of images associated with the edge portions a and b of the iris 23 and the cornea-reflected image d' respectively; c' a center position of the pupil 24; Yb' and Ya' the Y coordinates of upper and lower ends of the pupil circle, respectively; and Yd' the Y coordinate of the cornea-reflected image d.

Referring to FIG. 13, first, the cornea-reflected image coordinate Zd' shown in FIG. 14 is detected (step S21). Next, boundary point coordinates Zb', Za', Yb' and Ya' between the iris 23 and the pupil 24 are detected (step S22).

In Step S23, the pupil center c' is computed based on the detected values obtained by the preceding steps.

In step S24, a displacement angle $\ominus$ of the eyeball is computed based on the data obtained by the preceding steps. The displacement angle $\ominus$ is computed with respect to two-kind ones in a Z-X plane (horizontal direction) and Z-Y plane (vertical direction).

In step S25, the fixation point is computed on the basis of the displacement angle finally obtained.

Next, the second embodiment will be described in operation, by way of example, as to a case where a shutter speed is changed over.

The shutter speed is set up to 1/60 second in an initial state. Now, if the shutter speed is changed over to, for example, "1/100 second" by the shutter speed selection circuit 115, the shutter speed indication "1/100 second" is combined, by the fixation point display processing circuit 103 at the fixation point position detected by the fixation point position detection circuit 109, with the video signal outputted from the image pick-up circuit 114, and then the composition is displayed on the finder picture plane 102 of the electronic viewfinder 101.

The fixation point display processing circuit 103 is provided with a timer, under the control of which the shutter speed indication disappears after the lapse of a predetermined time.

In this manner, the shutter speed is displayed at the fixation point position, and thus it is possible to change over the shutter speed without taking an operator's eye off a camera subject image on an electronic viewfinder.

Likewise, with respect to selection of a focus mode (automatic or manual), selection of a white balance mode (automatic or manual), and so on also, they may be displayed on a similar basis. It is of course possible to provide an arrangement in which mode indications other than the above-mentioned indications are displayed at the fixation point position on a similar basis as discussed above.

The finder picture plane 102 involved in the second embodiment is also provided with a spectral characteristic as described in the first embodiment.

As described above, according to the present invention, information concerning a video camera photographing is displayed in such a manner that a visual line of the eye peeping through an electronic viewfinder unit is detected by visual line detection means, and the information is displayed together with an image of the camera subject at the position of the visual line on the finder picture plane. Accordingly, there is no need to take the visual line off the camera subject image of the finder picture plane, so that the necessary information display can be readily read. Thus, it is possible to provide a video camera excellent in an operational efficiency, releasing an operator from the trouble such as overlooking of the necessary information and warning, and losing of a shutter opportunity due to removal of the visual line from the camera subject image, etc.

Further, according to the present invention, a spectral characteristic of light emitted from the finder picture plane 102 is a spectral characteristic having no influence on light emitted from illumination means for use in visual line detection which is contained in visual line detection means. Hence, the view-finder light contains no infrared light, so that infrared noise can be removed from the output signal of the photo-electric device for use in visual line detection. Thus, it is possible to provide a video camera capable of detecting the visual line with higher detection accuracy.

It is apparent that the invention may be implemented with alternations without departing from the essential scope. While the embodiments described and illustrated above employ a scheme in which infrared light is projected to an operator's eye to detect his or her visual line, there may be employed, for example, such a visual line detection scheme that an image on the eye is taken in with an image pick-up device and so on without projecting infrared light beam, and the visual line is detected from the taken-in image pick-up signal.

In other words, the foregoing description of the embodiments has been given for illustrative purposes only and not to be construed as imposing any limitations in every respect.

The scope of the invention is, therefore, to be determined solely by the following claims and not limited by the text of the specification and, alternations made within a scope equivalent to the scope of the claims fall within the true spirit and scope of the invention.

What is claimed is:

1. A camera comprising:
   (A) an electronic viewfinder adapted to electrically display a photographing image;
   (B) visual line detection means for detecting the position of a camera operator's visual line on a picture plane of said electronic viewfinder; and
   (C) display processing means including settable timer means for temporarily displaying on said electronic viewfinder photographing-related information involved in a camera photographing,
   wherein said display processing means controls a display position of the photographing-related information in accordance with an output of said visual line detection means.

2. A camera according to claim 1, wherein said display processing means provides such a control that a display of said photographing-related information disappears after the lapse of a predetermined time.

3. A camera according to claim 1, wherein said visual line detection means includes light source means for projecting light on an operator's eyeball, and detects the operator's visual line by using a reflected light from the operator's eyeball.

4. A camera according to claim 3, wherein a spectral characteristic of light emitted from said electronic viewfinder is set to have no influence on a spectral characteristic of light emitted from said light source means.

5. A camera according to claim 1, further comprising recording means for recording the photographing image.

6. A camera according to claim 5, wherein said photographing-related information includes information related to said recording means.

7. A camera according to claim 6, wherein said photographing-related information is remaining amount information of a recording medium.

8. A camera according to claim 1, further comprising image pick-up means for converting an image of a subject into an electrical signal.

9. A camera according to claim 8, wherein said photographing-related information includes information related to said image pick-up means.

10. A camera according to claim 9, wherein said photographing-related information is exposure information.

11. A camera according to claim 1, wherein an output signal of said visual line detection means is used for a focus control.

12. A camera according to claim 1, wherein an output signal of said visual line detection means is used for an exposure control.

13. A camera comprising:
    (A) an electronic viewfinder adapted to electrically display a photographing image;
    (B) visual line detection means for detecting the position of a camera operator's visual line on a picture plane of said electronic viewfinder; and
    (C) display processing means for displaying on said electronic viewfinder camera defective information, involved in a camera photographing,
    wherein said display processing means controls a display position of the camera defective information in accordance with an output of said visual line detection means.

14. A camera according to claim 13, wherein said display processing means provides such a control that a display of said photographing-related information disappears after the lapse of a predetermined time.

15. A camera according to claim 13, wherein said visual line detection means includes light source means for projecting light on an operator's eyeball, and detects the operator's visual line by using a reflected light from the operator's eyeball.

16. A camera according to claim 13, further comprising recording means for recording the photographing image.

17. A camera according to claim 16, wherein said photographing-related information includes information related to said recording means.

18. A camera according to claim 13, further comprising image pick-up means for converting an image of a subject into an electrical signal.

19. A camera according to claim 13, wherein an output signal of said visual line detection means is used for a focus control.

20. A camera according to claim 13, wherein an output signal of said visual line detection means is used for an exposure control.

21. A camera according to claim 18, wherein said photographing-related information includes information related to said image pick-up means.

22. A camera comprising:
    (A) an electronic viewfinder adapted to electrically display a photographing image;
    (B) visual line detection means for detecting the position of a camera operator's visual Line on a picture plane of said electronic viewfinder; and
    (C) display processing means for displaying on said electronic viewfinder power source warning information, involved in a camera photographing,
    wherein said display processing means controls a display position of the power source warning information in accordance with an output of said visual line detection means.

23. A camera according to claim 22, wherein said display processing means provides such a control that a display of said photographing-related information disappears after the lapse of a predetermined time.

24. A camera according to claim 22, wherein said visual line detection means includes light source means for projecting light on an operator's eyeball, and detects the operator's visual line by using a reflected light from the operator's eyeball.

25. A camera according to claim 22, further comprising recording means for recording the photographing image.

26. A camera according to claim 25, wherein said photographing-related information includes information related to said recording means.

27. A camera according to claim 22, further comprising image pick-up means for converting an image of a subject into an electrical signal.

28. A camera according to claim 22, wherein an output signal of said visual line detection means is used for a focus control.

29. A camera according to claim 22, wherein an output signal of said visual line detection means is used for an exposure control.

30. A camera according to claim 27, wherein said photographing-related information includes information related to said image pick-up means.

31. A camera comprising:
    (A) an electronic viewfinder adapted to electrically display a photographing image;

(B) visual line detection means for detecting the position of a camera operator's visual line on a picture plane of said electronic viewfinder; and (C) display processing means for displaying on said electronic viewfinder photographing mode information, said photographing mode information being mode information indicating an automatic photographing mode or a manual photographing mode, wherein said display processing means controls a display position of the photographing mode information in accordance with an output of said visual line detection means.

32. A camera according to claim 31, wherein said photographing mode information includes a focus mode.

33. A camera according to claim 31, wherein said display processing means provides such a control that a display of said photographing-related information disappears after the lapse of a predetermined time.

34. A camera according to claim 31, wherein said visual line detection means includes light source means for projecting light on an operator's eyeball, and detects the operator's visual line by using a reflected light from the operator's eyeball.

35. A camera according to claim 31, further comprising recording means for recording the photographing image.

36. A camera according to claim 35, wherein said photographing-related information includes information related to said recording means.

37. A camera according to claim 31, further comprising image pick-up means for converting an image of a subject into an electrical signal.

38. A camera according to claim 31, wherein an output signal of said visual line detection means is used for a focus control.

39. A camera according to claim 31, wherein an output signal of said visual line detection means is used for an exposure control.

40. A camera according to claim 37, wherein said photographing-related information includes information related to said image pick-up means.

41. A camera comprising:

(A) an electronic viewfinder adapted to electrically display a photographing image;

(B) visual line detection means for detecting the position of a camera operator's visual line on a picture plane of said electronic viewfinder; and (C) display processing means for displaying on said electronic viewfinder white balance mode information, involved in a camera photographing, wherein said display processing means controls a display position of the white balance mode information in accordance with an output of said visual line detection means.

42. A camera according to claim 41, wherein said display processing means provides such a control that a display of said photographing-related information disappears after the lapse of a predetermined time.

43. A camera according to claim 41, wherein said visual line detection means includes light source means for projecting light on an operator's eyeball, and detects the operator's visual line by using a reflected light from the operator's eyeball.

44. A camera according to claim 41, further comprising recording means for recording the photographing image.

45. A camera according to claim 44, wherein said photographing-related information includes information related to said recording means.

46. A camera according to claim 41, further comprising image pick-up means for converting an image of a subject into an electrical signal.

47. A camera according to claim 41, wherein an output signal of said visual line detection means is used for a focus control.

48. A camera according to claim 41, wherein an output signal of said visual line detection means is used for an exposure control.

49. A camera according to claim 46, wherein said photographing-related information includes information related to said image pick-up means.

50. A camera comprises:

(A) an electronic viewfinder adapted to electrically display a photographing image;

(B) visual line detection means for detecting the position of a camera operator's visual line on a picture plane of said electronic viewfinder and providing output signals indicative of said detected position;

(C) means for generating signals containing character display data indicative of camera operation information; and (D) display processing means receiving said detection means output signals and said signals containing said display data for displaying on said electronic viewfinder said display data at said detected position of said operator's visual line.

51. A camera according to claim 56, further comprising recording means for recording the photographing image, wherein said photographing-related information includes information related to said recording means.

52. A camera according to claim 51, wherein said photographing-related information is remaining amount information of a recording medium.

53. A camera according to claim 56, further comprising image pick-up means for converting an image of a subject into an electric signal, wherein said photographing-related information includes information related to said image pick-up means.

54. A camera according to claim 53, wherein said photographing-related information is exposure information.

55. A camera comprising:

(A) image pick-up means for converting an image of a camera subject into an electric signal;

(B) recording means for recording a video signal output from said image pick-up means;

(C) an electronic viewfinder for displaying the video signal output from said image pick-up means;

(D) visual line detection means for detecting a camera operator's visual line position on a picture plane of said electronic viewfinder; and (E) display processing means including settable timer means for temporarily displaying on said electronic viewfinder photographing-related information involved in a camera photographing, wherein said display processing means controls a display position of the photographing-related information in accordance with an output of said visual line detection means.

56. A camera according to claim 55, wherein an output signal of said visual line detection means is used for a focus control.

57. A camera according to claim 55, wherein an output signal of said visual line detection means is used for an exposure control.

58. An electronic apparatus, comprising:

(A) display means for displaying an image;

(B) detecting means for detecting a position of a line of sight of an observer on a picture plane of said display means and generating output signals indicative of said detected position;

(C) means for generating signals containing character display data indicative of a warning of an abnormal condition concerning an operation of said electronic apparatus; and (D) display processing means receiving said detection means output signals and said signals containing said display data for displaying said display data on said display means at said detected position of said observer's visual line.

59. An electronic apparatus according to claim 58, wherein said display data ms power source information.

60. An electronic apparatus according to claim 58, wherein said display data is speed information.

61. An electronic apparatus, comprising:

(A) display means for displaying an image;

(B) detecting means for detecting a position of a line of sight of an observer on a picture plane of said display means and providing output signals indicative of said detected position;

(C) means for generating..signals containing character display data indicative of an operation state of said electronic apparatus; and (D) display processing means receiving said detecting means output signals and said signals containing said display data for displaying said display data on said display means at said detected position of said observer's visual line of sight.

62. An electronic apparatus according to claim 61, wherein said display data is power source information.

63. An electronic apparatus according to claim 61, wherein said display data ms speed information.

64. An electronic apparatus, comprising:

(A) display means for displaying an image;

(B) detecting means for detecting position of a line of sight of an observer on a picture plane of said display means and generating output signals indicative of said detected position;

(C) means for generating signals containing display data indicative of a control state of said electronic instrument; and (D) display processing means receiving said detecting means output signals and said signals containing said display data for displaying said display data on said display means at said detected position of said observer's line of sight and maintaining display of said display data for a predetermined time if the observer's line of sight leaves the detected position.

65. An electronic apparatus according to claim 64, wherein said display data ms power source information.

66. An electronic apparatus according to claim 64, wherein said display data ms speed information.

67. An electronic apparatus, comprising:

(A) display means;

(B) line of sight detecting means for detecting a position of a line of sight of an observer on a picture plane of said display means and generating output signals indicative of said detected position;

(C) abnormality detecting means for detecting an abnormal condition of said apparatus and generating signals containing display data indicative of the abnormal condition of said apparatus; and (D) display processing means receiving said output signals and said signals containing said display data for displaying said display data on said display means at said detected position of said observer's line of sight and maintaining display of said display data for a predetermined time if the observer's line of sight leaves the detected position.

68. An electronic apparatus according to claim 67, wherein said display data is power source information.

69. An electronic apparatus according to claim 67, wherein said display data is speed information.

* * * * *

UNITED STATES PATENT AND TRADEMARK OFFICE
CERTIFICATE OF CORRECTION

PATENT NO. : 5,570,156            Page 1 of 2

DATED : October 29, 1996

INVENTOR(S): Takashi Arai, et al.

It is certified that error appears in the above-identified patent and that said Letters Patent is hereby corrected as shown below:

Col. 3, line 61, change "O" to -- $\theta$ --.

Col. 6, line 50, change "B" to -- $\beta$ --.

Col. 7, line 14, change "and e" to -- and d --.

Col. 7, line 15, change "B" to -- $\beta$ --.

Col. 12, line 29, change "Line" to -- line --.

Col. 14, line 29, change "claim 56" to -- claim 50 --.

Col. 14, line 36, change "claim 56" to -- claim 50 --.

Col. 15, line 18, change "ms" to -- is --.

Col. 15, line 39, change "ms" to -- is --.

Col. 16, line 16, change "ms" to -- is --.

UNITED STATES PATENT AND TRADEMARK OFFICE
CERTIFICATE OF CORRECTION

PATENT NO. : 5,570,156
DATED : October 29, 1996
INVENTOR(S) : Takashi Arai, et al.

It is certified that error appears in the above-indentified patent and that said Letters Patent is hereby corrected as shown below:

Col. 16, line 18, change "ms" to --is--.

Signed and Sealed this

First Day of July, 1997

*Attest:*

BRUCE LEHMAN

*Attesting Officer*  *Commissioner of Patents and Trademarks*